United States Patent
Knechtel et al.

(10) Patent No.: US 10,802,924 B2
(45) Date of Patent: Oct. 13, 2020

(54) ASYNCHRONOUS SESSION STORING

(71) Applicant: SAP SE, Walldorf (DE)

(72) Inventors: Martin Knechtel, Dresden (DE); Axel Schroeder, Dresden (DE); Kay Jugel, Dresden (DE); Christof Momm, Dresden (DE)

(73) Assignee: SAP SE, Walldorf (DE)

( * ) Notice: Subject to any disclaimer, the term of this patent is extended or adjusted under 35 U.S.C. 154(b) by 199 days.

(21) Appl. No.: 15/658,902

(22) Filed: Jul. 25, 2017

(65) Prior Publication Data

US 2019/0034285 A1     Jan. 31, 2019

(51) Int. Cl.
| G06F 11/14 | (2006.01) |
| G06F 9/48  | (2006.01) |
| G06F 9/52  | (2006.01) |

(52) U.S. Cl.
CPC .......... *G06F 11/1451* (2013.01); *G06F 9/485* (2013.01); *G06F 9/4881* (2013.01); *G06F 9/52* (2013.01); *G06F 11/1461* (2013.01); *G06F 2201/84* (2013.01)

(58) Field of Classification Search
None
See application file for complete search history.

(56) References Cited

U.S. PATENT DOCUMENTS

| 8,347,405 | B2* | 1/2013 | Backhouse | ............. H04L 63/08 713/161 |
| 8,381,285 | B2 | 2/2013 | Dau et al. | |
| 8,615,631 | B2 | 12/2013 | Schroeder et al. | |
| 8,615,639 | B2 | 12/2013 | Schroeder et al. | |
| 8,990,166 | B2 | 3/2015 | Thomsen et al. | |
| 9,116,627 | B2 | 8/2015 | Thomsen et al. | |
| 9,354,988 | B2 | 5/2016 | Schroeder et al. | |
| 9,665,711 | B1* | 5/2017 | Jakobsson | ............. G06F 21/554 |
| 2009/0113109 | A1* | 4/2009 | Nelson | ................. G06F 11/203 711/6 |
| 2011/0239256 | A1* | 9/2011 | Gholmieh | ........... H04W 72/005 725/62 |
| 2013/0159339 | A1 | 6/2013 | Thomsen et al. | |
| 2013/0194271 | A1 | 8/2013 | Roesch et al. | |
| 2015/0326655 | A1* | 11/2015 | Quan | .................... H04L 67/104 709/201 |
| 2015/0365320 | A1* | 12/2015 | Xu | ........................ H04L 45/245 370/226 |
| 2017/0132037 | A1* | 5/2017 | Sevigny | ................ G06F 9/4881 |
| 2017/0168901 | A1* | 6/2017 | Tsao | .................... G06F 11/1451 |
| 2017/0329729 | A1* | 11/2017 | Chew | ..................... G06F 13/24 |

* cited by examiner

*Primary Examiner* — Richard L Bowen

(74) *Attorney, Agent, or Firm* — Fish & Richardson P.C.

(57) ABSTRACT

The present disclosure involves systems, software, and computer-implemented methods for asynchronous session storing. An example method includes receiving, by a first thread of a data processing apparatus, a backup trigger for backing up session of an application being executed by a second, separate thread of the data processing apparatus; serializing, by the first thread of the data processing apparatus, session, wherein serializing the session comprises blocking execution of the application by the second thread of the data processing apparatus; storing the serialized session into a database; and validating the stored session.

20 Claims, 6 Drawing Sheets

ASYNCHRONOUS SESSION STORING

BACKGROUND

Rule engines, such as DROOLS, IBM OPERATIONAL DECISION MANAGEMENT, etc., are used to maintain and reason about business knowledge. This knowledge is typically stateful and kept inside a volatile memory (for example, as a session) to increase performance. Keeping backups of this knowledge is important to manage the risk of an infrastructure outage and unintended user changes. Since the knowledge can easily grow to hundreds of megabytes, generating a conventional backup during runtime takes significant time and resources.

SUMMARY

The present disclosure describes asynchronous session storing.

In an implementation, a method of a rule system includes receiving, by a first thread of a data processing apparatus, a backup trigger for backing up session of an application being executed by a second, separate thread of the data processing apparatus; serializing, by the first thread of the data processing apparatus, session, wherein serializing the session comprises blocking execution of the application by the second thread of the data processing apparatus; storing the serialized session into a database; and validating the stored session.

The previously described implementation is implementable using a computer-implemented method; a non-transitory, computer-readable medium storing computer-readable instructions to perform the computer-implemented method, and a computer-implemented system comprising a computer memory, interoperably coupled with a hardware processor configured to perform the computer-implemented method/the instructions stored on the non-transitory, computer-readable medium.

The subject matter described in this specification can be implemented in particular implementations, so as to realize one or more of the following advantages. First, it can help store and provide backup of session as fresh as possible during runtime of an application while minimizing or otherwise reducing the impact on the execution of the application itself and network transfer. Second, it can record actions and be processed after crashes or hardware failures to ensure Atomicity, Consistency, Isolation, Durability (ACID) properties and restore the rule engine to a previously recorded state. Other advantages will be apparent to those of ordinary skill in the art.

The details of one or more implementations of the subject matter of this specification are set forth in the accompanying drawings and the description. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
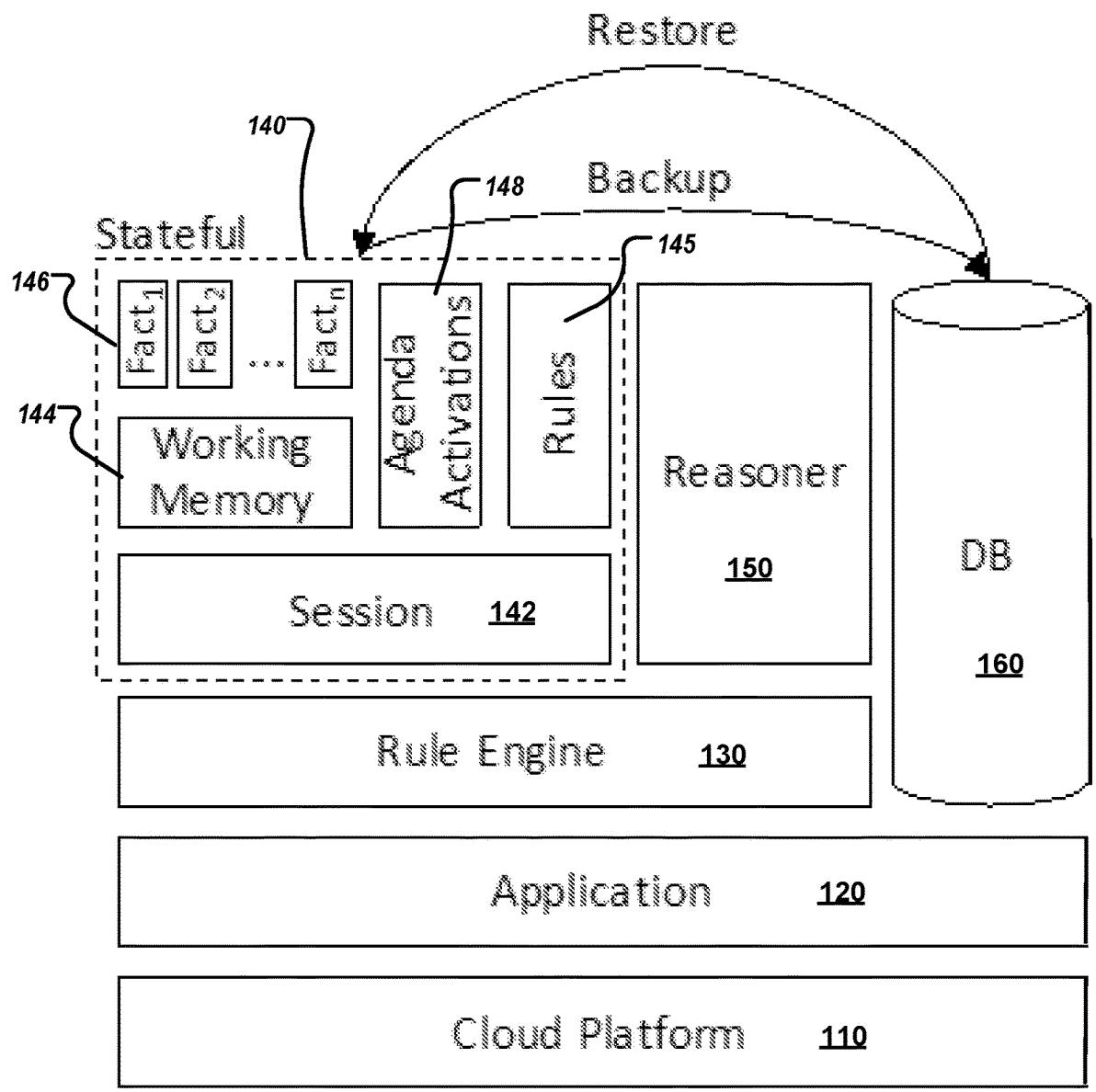
FIG. 1 is a block diagram illustrating an example production rule system in a cloud environment, according to an implementation.

The following detailed description describes asynchronous session storing, and is presented to enable any person skilled in the art to make and use the disclosed subject matter in the context of one or more particular implementations. Various modifications, alterations, and permutations of the disclosed implementations can be made and will be readily apparent to those or ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Operating stateful in-memory systems (for example, Production Rule Systems) in a cloud environment requires special safety mechanisms to reduce the risk of data loss as much as possible. While such in-memory technology greatly increases system performance, the risk of losing data due to unexpected events is high (for example, it may cause outages).

Example techniques are described that help solve the issue, which is critical for the capability of offering a production rule system as a cloud service. The example techniques can store session and provide backup during runtime for stateful in-memory systems. In some implementations, the example techniques asynchronously backup the session while minimizing or otherwise reducing performance impact to the application. At the same time, the backup can be kept as fresh as possible. Session refers to a current session of the engine, representing the "state" the engine is in. The session to be backed up or stored can include any data, information, or other representations of properties of the engine, such as amount of facts, rules, storage size, etc.

Asynchronous session storing refers to backing up or otherwise storing a session asynchronously. In other words, the session is stored at a later point in time than the request for storing has been triggered. For example, an application with the rule engine triggers stores a session from time to time by putting the request into a queue, for example, when an event has been processed. A backup thread listens to the queue and processes the request as soon as the backup thread has time for it. In some implementations, the engine keeps operating, while the session is stored in the database, which implies the stored session may be outdated at the time of storing. But compared to synchronous session storing, asynchronous session storing can avoid heavy locks on the engine that could lead to major performance loss. The backup can be done asynchronously by a parallel thread with low priority compared to the thread that is executing the application. In some implementations, a backup can be triggered at any point in time, but is executed only when the previous backup is finished and has not been overridden with a newer backup trigger.

In general, for any system (for example, an in-memory system) in which design time (a first dimension) and runtime (a second dimension) can be mixed and evolve over time, an administrator may change any master data of the system while users are creating more session data in parallel. Master data (for example, a set of rules) can be stored together with session data (for example, working memory of a rule engine). Modifying master data (for example, using gamification rules) may render the existing session or parts of it unusable. The disclosed data backup and restoring techniques can be applied to, for example, a database scheme that is changed during runtime, while other system components are writing and reading data from the database, or a knowledge-based system where ontology vocabulary changes during runtime and instances are changed at the same time. The disclosed techniques allow a versioning of these two dimensions (for example, through the use of a 2-dimensional (2D) ring buffer). The disclosed techniques allow for identifying multiple recovery points where both dimensions are compatible with each other's and can be restored.

FIG. 1 is a block diagram showing an example production rule system 100, according to an implementation. The example production rule system 100 can run one or more applications 120 in a cloud environment, such as, a cloud platform 110. The example production rule system 100 can include a rule engine 130 and a database 160. The rule engine 130 can include or be associated with a stateful portion 140 and a reasoner 150. The stateful portion 140 can include session 142 as well as its constituents, such as working memory 144, facts 146 (for example, Fact 1, Fact 2, . . . , Fact n), agenda activations 148, and rules 145. The session 142 can include session binaries that represent an instance of a flow that contains the working memory 144 and handles an assertion, modification, and retraction of facts 146 from the rule engine 130. Facts 146 are items that the rules 145 try to match. The working memory 144 contains information (for example, fact instances that do not exist outside of the working memory 144) that has been added to the example production rule system 100. An assertion, modification, and retraction operation adds, modifies, or removes fact instances from working memory 144, respectively.

As an example process, the rule engine 130 processes the facts 146 and rules 145 and performs pattern-matching to determine which rules 145 match the facts 146, for a given run through the set of facts. For example, when facts in working memory 144 are changed, conditions for rules 145 can be evaluated, and matching rules can be added to the agenda activations 148. Rules 145 that no longer match are removed from the agenda activations 148. The rule engine 130 runs and executes actions (fires), for activated rules.

In some implementations, customers may change the behavior of rules during runtime, which could potentially render the existing session 142, working memory 144 or planned agenda activations 148 invalid and lead to a broken rule engine state. The described example techniques can back up the stateful portion 140 of the rule engine 130, such as, the session 142 with its constituents, into the database 160 and can restore the stateful portion 140 from the database 160 for the rule engine 130.

Figure 2:
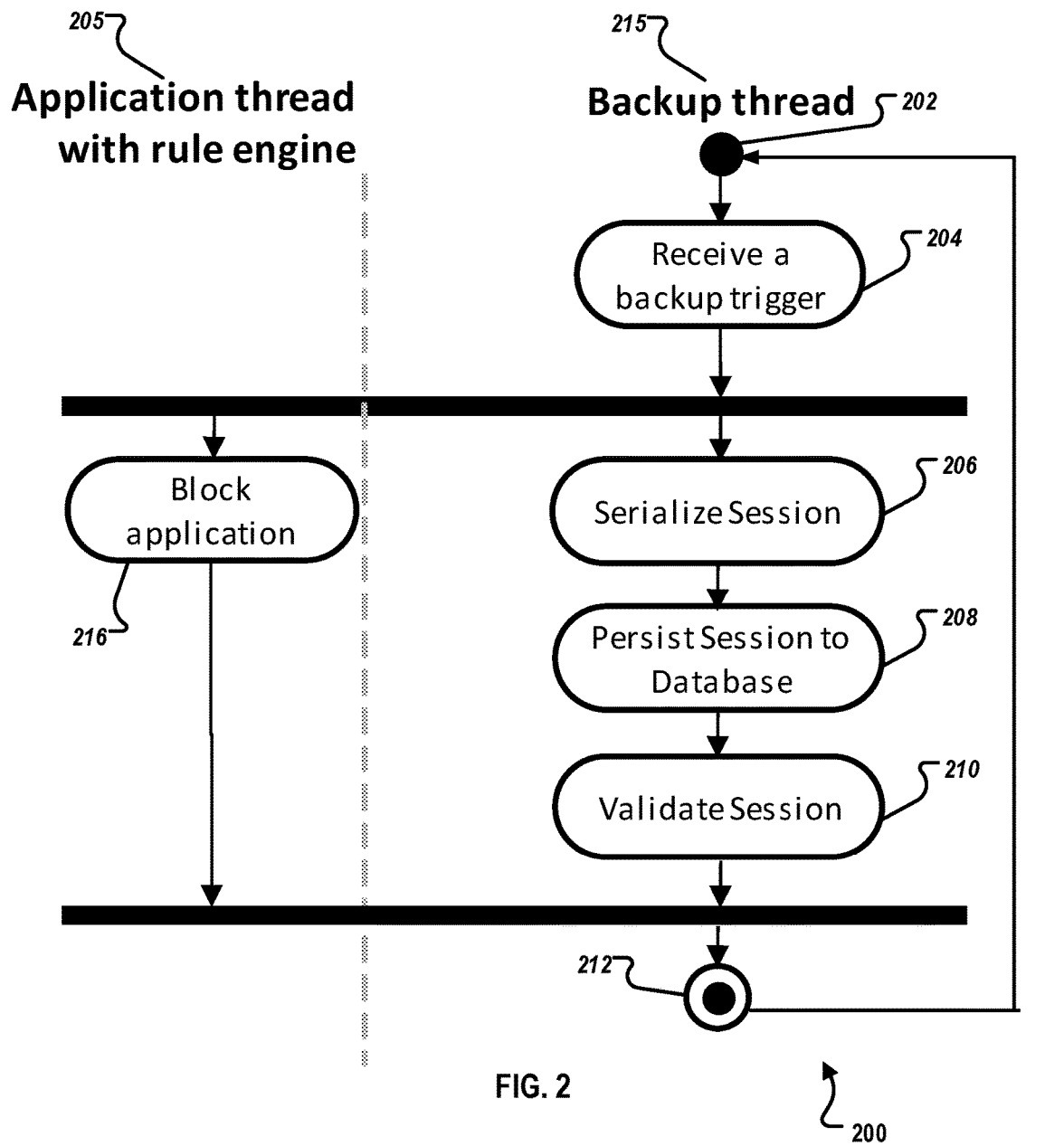
FIG. 2 is flowchart illustrating an example method of asynchronous session storing, according to an implementation.

FIG. 2 is flowchart illustrating an example method 200 of asynchronous session storing, according to an implementation. For clarity of presentation, the description that follows generally describes method 200 in the context of the other figures in this description. However, it will be understood that method 200 may be performed, for example, by any suitable system, environment, software, and hardware, or a combination of systems, environments, software, and hardware, as appropriate. In some implementations, various steps of method 200 can be run in parallel, in combination, in loops, or in any order.

In some implementations, method 200 may be implemented with two separated threads of a data processing apparatus. The two threads can run in parallel. A first thread is configured to execute an application with a rule engine (for example, the rule engine 130 in FIG. 1) and can be referred to as an application thread with rule engine 205. A second thread is configured to store or otherwise backup session associated with the execution of the application by the first thread. The second thread can be referred to as a backup thread 215. Note that, although shown as a single thread in FIG. 2, each of the application threads with rule engine 205 and the backup thread 215 can be implemented with more than one thread. In some implementations, the backup thread 215 runs with lower scheduling priority than the application thread with rule engine 205, for example, to reduce system load as the backup can cause high load to the database.

At 202, the backup thread 215 can be in sleep mode. The sleep mode can be configured, for example, to further reduce system load. For example, the backup thread 215 is refrained from backing up data for a defined time interval, which is referred to as a sleep interval. The sleep interval can be configured, for example, to balance (1) low system load and (2) fresh backups. The duration of the sleep interval can be fixed or determined dynamically. The sleep interval can be determined based on the size of the session, data type, CPU utilization, database utilization, system work load, available hardware, or a combination of them. In some implementations, the longer the size of the session, the longer the sleep interval, for example, to maintain a reasonable system load and data stream for storing the session. As an example, the sleep mode of a 10-second sleep interval per megabyte and 5 seconds base sleep time (a sleep time of 5 seconds regardless of the amount of data). For example, storing 3 megabyte would lead to 30+5 seconds of sleep time. An appropriate sleep mode can be determined based on the application and hardware. For example, the above example sleep mode is found to be a good tradeoff for available and dedicated hardware, which limits the data stream to a maximum of 6 MByte/min. From 202, method 200 proceeds to 204.

At 204, the backup thread 215 receives a backup trigger for backing up session of an application that is being executed by the application thread with rule engine 205. The backup trigger can include, for example, an event that arrives at the rule engine. As an example, in a case that "a helpdesk employee just responded to a ticket," an action triggered by the rule engine after evaluating all rules and facts might be "grant 1 experience point to this employee." The action can serve as a backup trigger for backing up the session of the application that is being executed by the application thread with rule engine 205.

In some implementations, the backup trigger can be configured to occur regularly or from time to time. For example, the backup trigger can be configured to occur regularly (for example, every 10 minutes), on shutting down the engine, or after the lapse of the sleep interval relative to a previous successful backup. As another example, the backup trigger can be configured to occur when a certain number of events that arrive at the rule engine (every event or every 5 events).

In some implementations, receiving a backup trigger includes receiving backup candidate data. For example, after receiving the backup trigger, the backup thread 215 takes, retrieves, or otherwise receives, from a data store (for example, a queue), backup candidate data. The backup candidate data can include, for example, the actual candidate data that is to be backed up or otherwise stored by the backup thread 215 into a database or a reference to the actual candidate data to be backed up. The backup candidate can differ from the current session in some ways. For instance, the session may contain events, which were received after the candidate was chosen. It is also possible that background activities such as scheduled event triggers happened after the candidate was chosen. Thus, it is desirable to choose the candidate as new as possible. In some instances, the actual candidate data to be backed up is not stored. In some other instances, the actual candidate data for every trigger is stored (for example, for audit logging). As an example implementation, the full actual candidate data to be backed up can be stored, for example, using a multiple-element queue. This implementation can guarantee a backup of the data at the time of the trigger but it may have strong impacts on system performance. As another example implementation, only a reference to the actual candidate data is stored, and no queue is required. The reference points to the actual candidate data which will be stored when the backup thread becomes active. This implementation has less impact on system performance and allow always storing latest data as possible. As yet another example implementation, a reference to the actual candidate data is stored in a queue. This implementation can facilitate the backup thread to manage multiple backup candidates (for example, one backup thread accepts backup triggers from multiple rule engines).

The data store for storing the backup candidate data can be a pointer, a one-element queue, a multi-element queue, a data bank, a data container, or another type of data storing device. The data storing device can be a component, software, which handles the data storing. The queue can be in-memory and thus volatile, not persistent storage. For example, the queue can be a part of a working memory (for example, the working memory 144 in FIG. 1). In some implementations, the queue stores only the storage request with a pointer to the rule engine. It does not contain the serialized session already since serialization consumes CPU and is only done at the latest point in time, i.e., right before storing to DB. In some implementations, the backup thread 215 regularly checks the data store to determine if there is any backup candidate data for asynchronous session storing. From 204, method 200 proceeds to 206.

At 206, the backup thread 215 serializes session. In some implementations, the backup thread 215 obtains the data of the session as byte array, so it can be stored in the data base. Serializing the session by the backup thread 215 includes blocking execution of the application by the application thread with rule engine 205. For example, the backup thread 215 blocks the application thread with rule engine 205 in order not to change the state of the session in the middle of serialization which would lead into an inconsistent state. As a result, the application thread with rule engine 205 is blocked from running, for example, until the serialization ends, as shown at 216. Blocking can for instance be performed using a lock or semaphore, which is either stored in a variable in the rule engine or in the data base (for example, calling request.engine.serialize( )). In some implementations, as soon as an application calls the rule engine and the call halts blocking, the application is blocked as well. In some implementations, as discussed in connection with 204, the queue contains a request with a pointer "request.engine" to the rule engine. Serialization calls request.engine.serialize( ) and takes some time, which can be implemented by the rule engine, for example Drools. The result of the operation is a block of binary code. The block of binary code can be compressed with GZIP and stored to a database. During serialization the queue might be updated again with the next backup candidate data as discussed in connection with FIG. 3 in the following where the queue is updated while one session is processed.

In some implementations, the serialization process can be kept as short as possible to minimize or otherwise reduce performance impact due to the blocking of the application thread with rule engine 205. This can be achieved by only serializing data, which is not stored in the data base, yet. For instance, if facts are stored separately in the database, it is not necessary to keep them in the session serialized but can instead be inserted after deserializing the session again. From 206, method 200 proceeds to 208.

Figure 4:
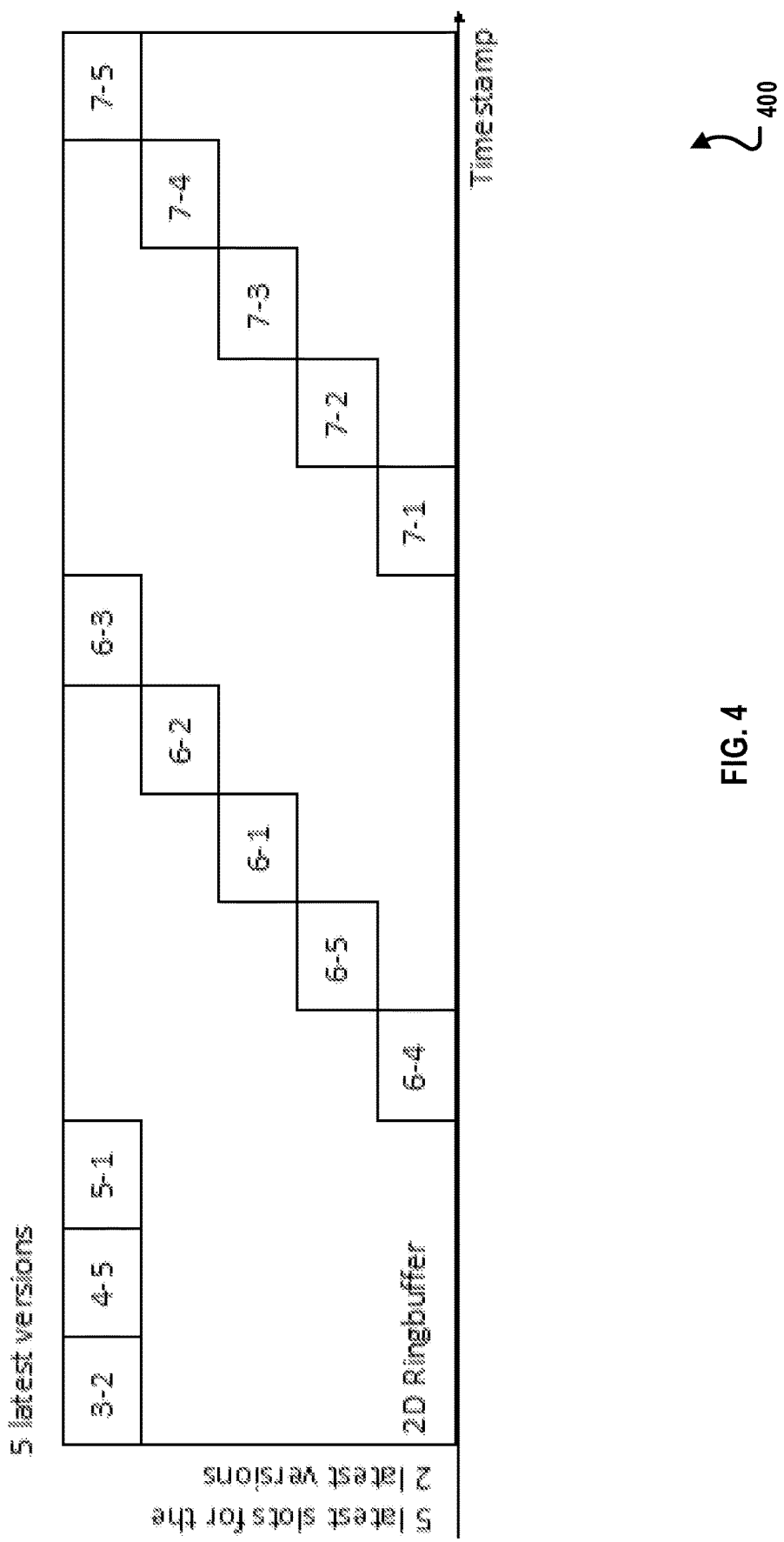
FIG. 4 is block diagram illustrating an example 2-dimensional (2D) ring buffer for asynchronous session storing, according to an implementation.

At 208, the backup thread 215 stores the serialized session to a database, for example, a persistent database such as a relational database. To limit the memory consumption, a ring buffer can be used to store the serialized session. A ring buffer has a fixed maximum size and will be overwriting the oldest data when new data comes in and the buffer is full. Additional or different types of data store can be used. FIG. 4 described below shows a 2D ring buffer as an example data store that is used to store the serialized session. From 208, method 200 proceeds to 210.

At 210, validating the session stored in the database. In some implementations, a session stored in the database, namely, a session that has been backed up, might be inconsistent if some implementation is wrong (for example, when the application thread with rule engine 205 has not been blocked properly while serializing the session at 204 so that it has been altered partly). To prove that a session in a database is valid, a validation check can be performed, for example, by instantiating a "sand box" rule engine and loading the session. As an example, a sandbox system that behaves identically or substantially similar to the live system can be created. From the data store that stores the serialized session (for example, a 2D ring buffer), the session (for example, a combination of both dimensions (a set of rules and a session snapshot)) to be restored into the sandbox can be loaded. Then tests against the sandbox can be triggered to assess if both versions (that is, master data and session data) are compatible. If both versions are compatible or consistent, which means they cause no conflicts when the old data is loaded into the current rule engine, they are considered "successfully validated" and marked as such within the 2D ring buffer. For example, the session is marked as valid with a Boolean flag set to true, otherwise it is marked as "validation failed" with the Boolean flag set to false and cannot be restored. If the validation is not successful, in some implementations, the stored session can stay in the DB and might be useful for the administrator. In another implementation, the stored session could be removed from the DB or sent a report to the administrator through an E-mail or other notifications. In some implementations, the tests against the sandbox can include creating a new rule engine, loading the session, checking whether there are any exceptions thrown by the rule engine, disposing the rule engine, and storing the validation result true/false Boolean to the DB.

Figure 3:
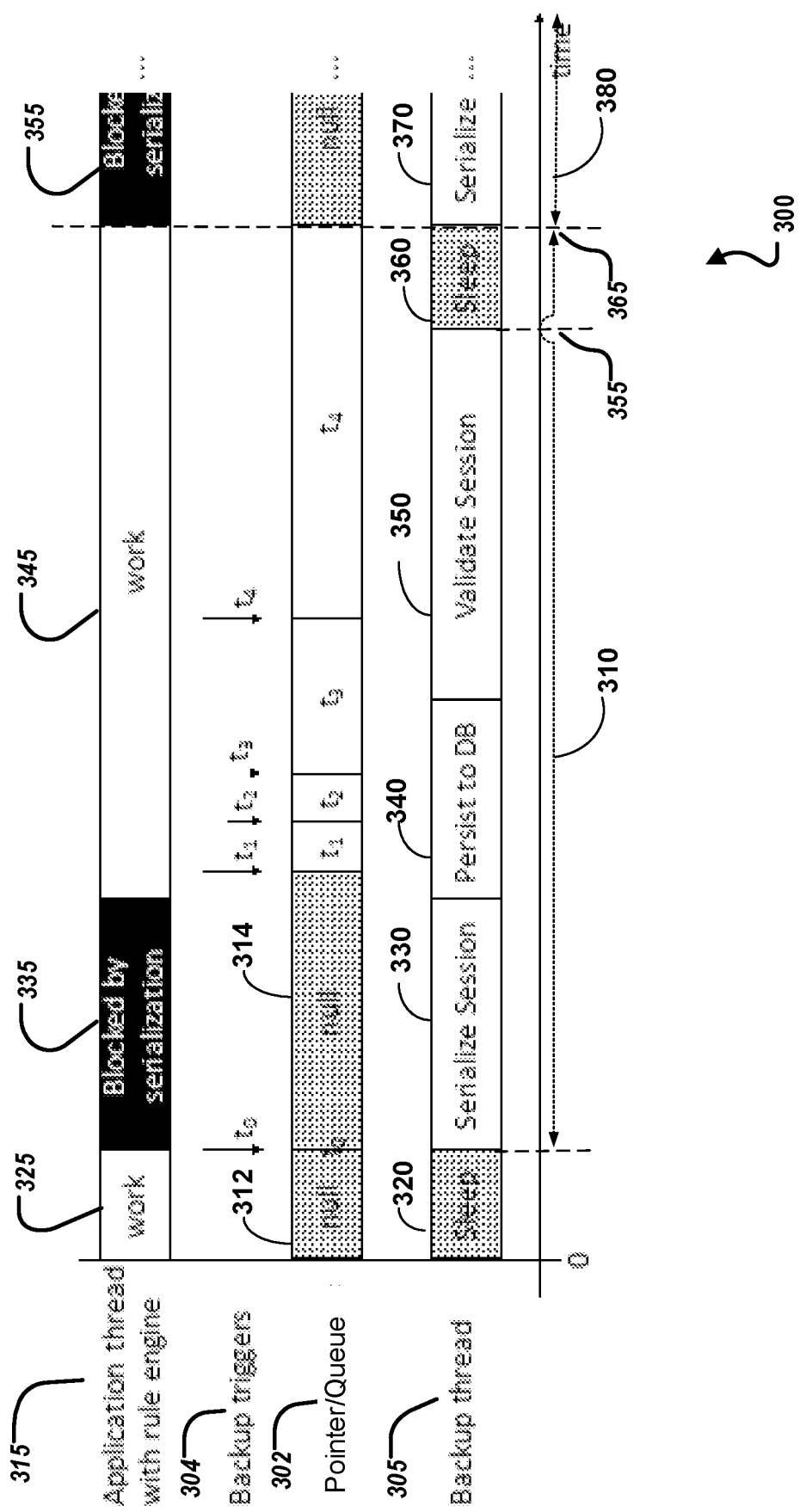
FIG. 3 is block diagram illustrating an example timeline of asynchronous session storing, according to an implementation.

In some implementations, the validation operation can be configured to occur at specified time instances, upon certain triggers, or according to a hybrid approach combining several of them. For example, in some implementations, the validation can be configured to occur immediately after persisting the session to the database, as shown in FIG. 3 below. In some implementations, the validation can be configured to occur by setting the validation flag only when a backup has been successfully restored. This mechanism can be referred to as lazy validation that requires less system load but bears the disadvantage that it is never known whether a backup is valid until it is actually required. In some implementations, the validation can be scheduled by a cron job or the like to validate hourly, daily, etc. In some implementations, the data store (for example, a 2D ring buffer) can be configured to keep validated sessions longer than sessions not yet validated. From 210, method 200 proceeds to 212.

At 212, after validating the stored session, the backup thread 215 finishes one backup cycle of the asynchronous session storing process. Once all queued backup candidates have been stored, the backup thread 215 may enter into a sleep interval during which the backup thread 215 is refrained from backing up data. Method 200 may go back to 202 and wait until it receives another backup trigger at 204 to repeat the process. For example, after a successful backup, the backup thread 215 sleeps a sleep interval before receiving another backup trigger and then wakes up from the sleep mode and enters into another backup cycle of the asynchronous session storing process.

In some implementations, upon terminating the application that is executed by the application thread with rule engine 205, the backup thread 215 gets notified and blocks the application thread with rule engine 205 until the backup thread 215 finishes its work, such as clearing the queue of events to the rule engine. Operations during a termination process of an application are discussed in greater detail in connection with FIG. 5. After the termination of the application, method 200 ends.

FIG. 3 is a block diagram illustrating an example timeline 300 of asynchronous session storing, according to an implementation. The timeline 300 is an example implementation of method 200 in FIG. 2, which shows queue updates and separate threads for application and backup over time. Specifically, FIG. 3 shows a backup thread 305 and an application thread with rule engine 315 that corresponds to the backup thread 215 and application thread with rule engine 205 in FIG. 2, respectively. FIG. 3 also shows multiple backup triggers 304 and a pointer/queue 302 that is used for storing backup candidate data to be stored into a database by the backup thread 305.

Before receiving a backup trigger at t0, the application thread with rule engine 315 is in a work mode 325 executing the application while the backup thread 305 is in a sleep mode 320 refrained from backing up the session. The pointer/queue 302 is null or empty at 312 so there is no backup candidate data yet.

Upon receiving the backup trigger at t0, the backup thread 305 wakes up from the sleep mode 320 and enters into a serialization phase 330 that serializes the session, whereas the application thread with rule engine 315 is blocked by the serialization at 335. The pointer/queue 302 is still empty at 314 with no backup candidate data yet. The application thread with rule engine 315 is blocked during the entire serialization phase 330 so that no change of the state of the session, which might lead into an inconsistent state, occurs in the middle of the serialization phase 330. The serialization phase 330 can be configured to be as short as possible so as to minimize the blocking of the application thread with rule engine 315 at 335.

Once the serialization phase 330 of the backup thread 305 ends, the application thread with rule engine 315 returns to work at 345 to continue running the application. For example, as discussed above, serialization sets a lock and unlocks it after the serialization is done.

While the application thread with rule engine 315 continues its execution of the application after the serialization phase 330, the backup thread 305 continues to perform other non-blocking operations of the example method 200 of asynchronous session storing. As illustrated, the backup thread 305 continues to persist the serialized session to a database (DB) such as a relational database at 340, and validate the session at 350 immediately after the session has been stored in the database.

As shown in the example of FIG. 3, during the work mode 345 of application thread with rule engine 315, additional backup triggers such as $t_1$, $t_2$, $t_3$, $t_4$ occur. However, the backup thread 305 may not back up the session as frequently as the arrivals of the backup triggers. In some implementations, to limit the load to the database, the backup may only occur at certain specified time intervals and later backup triggers that occur before the backup thread 305 finishes one backup cycle 310 of the asynchronous session storing process may be ignored. In some implementations, only one reference is stored that is pointing to the session of one engine which needs to be backed up by the asynchronous backup thread. Any new backup trigger are being ignored for that engine session, as it is already queued. In this case, only redundant triggers can be ignored, because the same data is queued by reference. In some other implementations, the backup thread manages multiple rule engines. For each rule engine, one reference is queued and additional triggers for this engine are ignored. In some other implementations, the backup thread receives a trigger containing the full session data to be backed up (for example, as part of audit logging). In this case, no triggers will be ignored.

As shown in FIG. 3, the backup thread 305 starts the backup cycle 310 upon the receipt of the backup trigger to, and will store the freshest backup candidate data available in the pointer/queue 302 into the database when the backup thread 305 persists the serialized session to the database at 340. For example, before receiving the backup trigger t0, the pointer/queue 302 is empty. When $t_0$ triggers the session storing, the session corresponding to the backup trigger $t_0$ is read and removed from the queue, as the session store handler is not busy at that time. For backup trigger $t_1$, the session corresponding to the backup trigger $t_1$ is kept in the pointer/queue 302, as the handler is busy. The backup thread 305 can react in response to the later backup triggers such as $t_2$, $t_3$, $t_4$ that occur within the backup cycle 310 in a similar manner to what has been described previously.

Once the validation at 350 is done, the backup thread 305 finishes the backup cycle 310 of the asynchronous session storing process. The backup thread 305 can then enter into a sleep mode 360 until a next backup (for example, a new backup cycle 380 that starts serializing session at 370). In some implementations, without a sleep interval, backups can cause high load to the database, for example, when a backup is triggered on every event to the rule engine, and there are 5 events per second, and a serialized session requires 5 Mbyte. The data stream to the database in this example is 25 MByte/s=1.5 GByte/min, which might already be undesirably high.

The backup thread 305 can start the new backup cycle 380 of the asynchronous session storing upon another backup trigger and after the lapse of the sleep interval of the sleep mode 360 at 365.

FIG. 4 is a block diagram illustrating an example 2-dimensional (2D) ring buffer 400 for asynchronous session storing, according to an implementation. The 2D ring buffer 400 is an example data store that is used to store the serialized session at 208 of method 200. The 2D ring buffer 400 has one dimension of time (represented by slots or timestamp) and another dimension of versions of the sessions. In some implementations, a slot corresponds to a backup of the session, for example, upon receiving a backup trigger. As such, each slot is a snapshot of the then-current session. When a rule changes (for example, modification, addition or removal), a new version for all rules is created. The 2D ring buffer 400 shown in FIG. 4 limits disk space consumption by keeping only 5 last versions and 5 slots each for the 2 newest versions of the rules. The dimension of the ring buffer can be set to another size. As shown in FIG. 4, the 2D ring buffer 400 keeps the latest 5 slots of Version 6: 6-1, 6-2, 6-3, 6-4, and 6-5, and the latest 5 slots of Version 7: 7-1, 7-2, 7-3, 7-4, and 7-5. Upon a rule change, a newer version, say, Version 8 will be created and then be backed up upon a next backup process. The 2D ring buffer 400 keeps 5 last versions, from Version 3 to Version 7, where only one slot is maintained for each of the older versions denoted as 3-2, 4-5, and 5-1 in the current example shown in FIG. 4.

Figure 5:
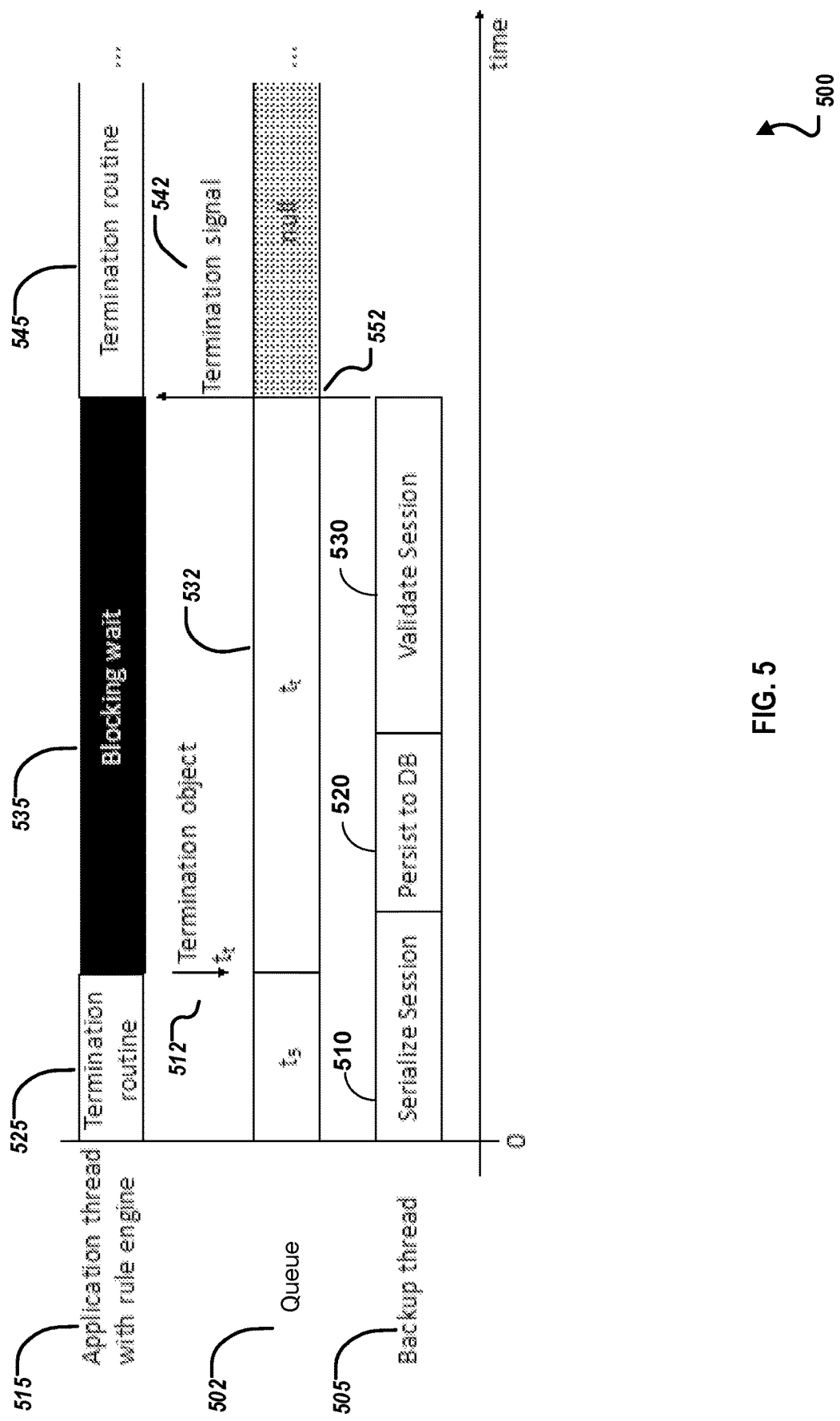
FIG. 5 is block diagram illustrating an example timeline of an application termination process in connection with asynchronous session storing, according to an implementation.

FIG. 5 is block diagram illustrating an example timeline of an application termination process 500, according to an implementation. In some applications, such as cloud applications, regular releases of the applications can be configured (for example, every week) to restart the cloud applications. This would allow clearing and restarting the backup thread. FIG. 5 shows a backup thread 505 and an application thread with rule engine 515 that corresponds to the backup thread 215 and application thread with rule engine 205 in FIG. 2, respectively. FIG. 5 also shows a queue 502 that is used for storing backup candidate data to be stored into a database by the backup thread 505.

Upon terminating the application, the application thread with rule engine 515 can execute a termination routine at 525. In some implementations, the termination routine triggers the session store in background and does not wait for the session store right away at 525 but does other operations in the meantime. At the end of the other operations, the termination routine 525 enters into a blocking wait 535 to wait for the session store. In FIG. 5, a termination object $t_t$ 512 is inserted and sent to the queue 502 for back up. Accordingly, the queue 502 stores the $t_t$ at 532. The termination object 512 can be a special queue object of type, which is evaluated and termination is triggered accordingly. In some implementations, the termination object 512 will not be stored, as it is a mere trigger without any data.

For the session store, the backup thread 505 starts to serialize session at 510, rendering the application thread with rule engine 515 entering into the blocking wait 535. During the blocking wait 535, the application thread with rule engine 515 is blocked from executing.

The backup thread 505 blocks the application until it finishes its work that includes, for example, persisting session into the database at 520 and validating the session in the database at 530. Once the backup thread 505 finishes its termination procedure during the application termination process 500, at 552, the termination object $t_t$ is taken out of the queue 502 if the queue is persisted in non-volatile memory. In some other implementations, the application may restart and the queue is re-created/re-initialized. The backup thread 505 thus clears the queue 502 so that the queue 502 is empty. Then backup thread 505 sends a termination signal 542 to the application thread with rule engine 515 so that the application thread with rule engine 515 can return to its termination routine at 545.

Figure 6:
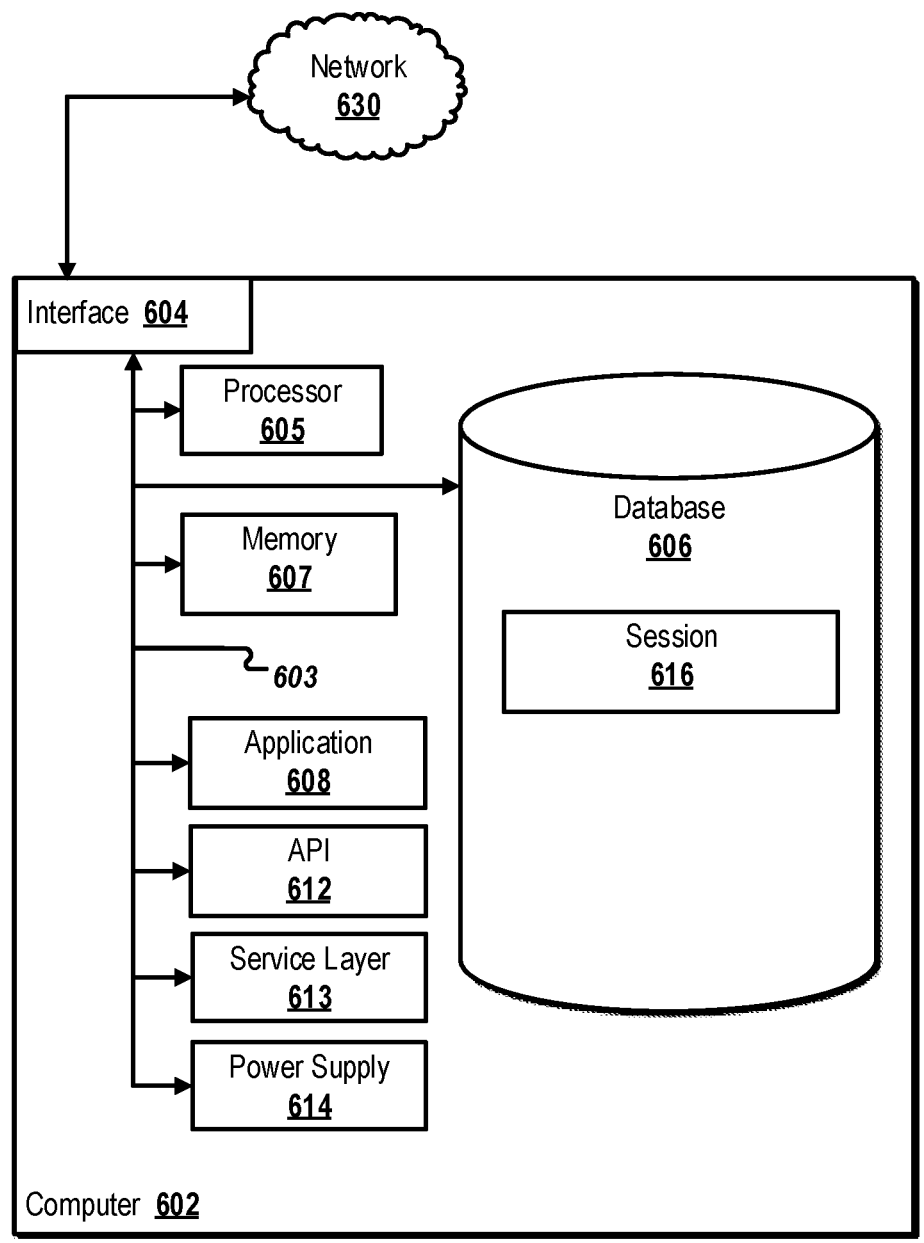
FIG. 6 is a block diagram illustrating an example computer system used to provide computational functionalities associated with described algorithms, methods, functions, processes, flows, and procedures as described in the instant disclosure, according to an implementation.

FIG. 6 is a block diagram of an example computer system 600 used to provide computational functionalities associated with described algorithms, methods, functions, processes, flows, and procedures, as described in the instant disclosure, according to an implementation. The illustrated computer 602 is intended to encompass any computing device such as a server, desktop computer, laptop/notebook computer, wireless data port, smart phone, personal data assistant (PDA), tablet computing device, one or more processors within these devices, or any other suitable processing device, including physical or virtual instances (or both) of the computing device. Additionally, the computer 602 may comprise a computer that includes an input device, such as a keypad, keyboard, touch screen, or other device that can accept user information, and an output device that conveys information associated with the operation of the computer 602, including digital data, visual, or audio information (or a combination of information), or a graphical user interface (GUI).

The computer 602 can serve in a role as a client, network component, a server, a database or other persistency, or any other component (or a combination of roles) of a computer system for performing the subject matter described in the instant disclosure. The illustrated computer 602 is communicably coupled with a network 630. In some implementations, one or more components of the computer 602 may be configured to operate within environments, including cloud-computing-based, local, global, or other environment (or a combination of environments).

At a high level, the computer 602 is an electronic computing device operable to receive, transmit, process, store, or manage data and information associated with the described subject matter. According to some implementations, the computer 602 may also include or be communicably coupled with an application server, e-mail server, web server, caching server, streaming data server, or other server (or a combination of servers).

The computer 602 can receive requests over network 630 from a client application (for example, executing on another computer 602) and respond to the received requests by processing the received requests using an appropriate software application(s). In addition, requests may also be sent to the computer 602 from internal users (for example, from a command console or by other appropriate access method), external or third-parties, other automated applications, as well as any other appropriate entities, individuals, systems, or computers.

Each of the components of the computer 602 can communicate using a system bus 603. In some implementations, any or all of the components of the computer 602, hardware or software (or a combination of both hardware and software), may interface with each other or the interface 604 (or a combination of both), over the system bus 603 using an application programming interface (API) 612 or a service layer 613 (or a combination of the API 612 and service layer 613). The API 612 may include specifications for routines, data structures, and object classes. The API 612 may be either computer-language independent or dependent and refer to a complete interface, a single function, or even a set of APIs. The service layer 613 provides software services to the computer 602 or other components (whether or not illustrated) that are communicably coupled to the computer 602. The functionality of the computer 602 may be accessible for all service consumers using this service layer. Software services, such as those provided by the service layer 613, provide reusable, defined functionalities through a defined interface. For example, the interface may be software written in JAVA, C++, or other suitable language providing data in extensible markup language (XML) format or other suitable format. While illustrated as an integrated component of the computer 602, alternative implementations may illustrate the API 612 or the service layer 613 as stand-alone components in relation to other components of the computer 602 or other components (whether or not illustrated) that are communicably coupled to the computer 602. Moreover, any or all parts of the API 612 or the service layer 613 may be implemented as child or sub-modules of another software module, enterprise application, or hardware module without departing from the scope of this disclosure.

The computer 602 includes an interface 604. Although illustrated as a single interface 604 in FIG. 6, two or more interfaces 604 may be used according to particular needs, desires, or particular implementations of the computer 602. The interface 604 is used by the computer 602 for communicating with other systems that are connected to the network 630 (whether illustrated or not) in a distributed environment. Generally, the interface 604 comprises logic encoded in software or hardware (or a combination of software and hardware) and is operable to communicate with the network 630. More specifically, the interface 604 may comprise software supporting one or more communication protocols associated with communications such that the network 630 or interface's hardware is operable to communicate physical signals within and outside of the illustrated computer 602.

The computer 602 includes a processor 605. The processor 605 can be a single-thread processor or a multi-thread processor. Although illustrated as a single processor 605 in FIG. 6, two or more processors may be used according to particular needs, desires, or particular implementations of the computer 602. Generally, the processor 605 executes instructions and manipulates data to perform the operations of the computer 602 and any algorithms, methods, functions, processes, flows, and procedures as described in the instant disclosure. As an example, the processor 605 can be a multi-thread processor that have two separated threads to execute operations of the application thread with rule engine 205 and the backup thread 215 described in connection with FIG. 2, respectively. In some implementations, the computer 602 can include two or more processors 605 and one processor 605 is configured to execute the operations of the application thread with rule engine 205 while another processor 605 is configured to execute the operations of the backup thread 215 described in connection with FIG. 2.

The computer 602 also includes a database 606 that can hold data for the computer 602 or other components (or a combination of both) that can be connected to the network 630 (whether illustrated or not). For example, database 606 can be an in-memory, conventional, or other type of database storing data consistent with this disclosure. In some implementations, database 606 can be a combination of two or more different database types (for example, a hybrid in-memory and conventional database) according to particular needs, desires, or particular implementations of the computer 602 and the described functionality. Although illustrated as a single database 606 in FIG. 6, two or more databases (of the same or combination of types) can be used according to particular needs, desires, or particular implementations of the computer 602 and the described functionality. While database 606 is illustrated as an integral component of the computer 602, in alternative implementations, database 606 can be external to the computer 602. As an example, the database 606 can be used to implement the database 160 of the example production rule system 100 in FIG. 1. As illustrated, the database 606 holds previously described session 616 that is backed up by the example method 200 of asynchronous session storing.

The computer 602 also includes a memory 607 that can hold data for the computer 602 or other components (or a combination of both) that can be connected to the network 630 (whether illustrated or not). For example, memory 607 can be random access memory (RAM), read-only memory (ROM), optical, magnetic, and the like, storing data consistent with this disclosure. In some implementations, memory 607 can be a combination of two or more different types of memory (for example, a combination of RAM and magnetic storage) according to particular needs, desires, or particular implementations of the computer 602 and the described functionality. Although illustrated as a single memory 607 in FIG. 6, two or more memories 607 (of the same or combination of types) can be used according to particular needs, desires, or particular implementations of the computer 602 and the described functionality. While memory 607 is illustrated as an integral component of the computer 602, in alternative implementations, memory 607 can be external to the computer 602. In some implementations, memory 607 can include an in-memory system, such as the example production rule system 100 in FIG. 1. For example, memory 607 can be used to include the stateful portion 140 and reasoner 150 of the example production rule system 100 in FIG. 1.

The application 608 is an algorithmic software engine providing functionality according to particular needs, desires, or particular implementations of the computer 602, particularly with respect to functionality described in this disclosure. For example, application 608 can serve as one or more components, modules, or applications. Further, although illustrated as a single application 608, the application 608 may be implemented as multiple applications 608 on the computer 602. In addition, although illustrated as integral to the computer 602, in alternative implementations, the application 608 can be external to the computer 602. As an example, the application 608 can be used to implement the one or more applications 120 of the example production rule system 100 in FIG. 1.

The computer 602 can also include a power supply 614. The power supply 614 can include a rechargeable or non-rechargeable battery that can be configured to be either user- or non-user-replaceable. In some implementations, the power supply 614 can include power-conversion or management circuits (including recharging, standby, or other power management functionality). In some implementations, the power supply 614 can include a power plug to allow the computer 602 to be plugged into a wall socket or other power source to, for example, power the computer 602 or recharge a rechargeable battery.

There may be any number of computers 602 associated with, or external to, a computer system containing computer 602, each computer 602 communicating over network 630. Further, the term "client," "user," and other appropriate terminology may be used interchangeably, as appropriate, without departing from the scope of this disclosure. Moreover, this disclosure contemplates that many users may use one computer 602, or that one user may use multiple computers 602.

Described implementations of the subject matter can include one or more features, alone or in combination. A computer-implemented method of a rule system includes receiving, by a first thread of a data processing apparatus, a backup trigger for backing up session of an application being executed by a second, separate thread of the data processing apparatus; serializing, by the first thread of the data processing apparatus, session, wherein serializing the session includes blocking execution of the application by the second thread of the data processing apparatus; storing the serialized session into a database; and validating the stored session.

The foregoing and other described implementations can each, optionally, include one or more of the following features:

A first feature, combinable with any of the following features, including, after validating the stored session, entering into a sleep interval during which the first thread of the data processing apparatus is refrained from backing up data.

A second feature, combinable with any of the previous or following features, wherein receiving a backup trigger includes receiving the backup trigger during a sleep interval during which the first thread of the data processing apparatus is refrained from backing up data.

A third feature, combinable with any of the previous or following features, wherein the sleep interval is determined dynamically based on a size of the stored session.

A fourth feature, combinable with any of the previous or following features, wherein receiving a backup trigger includes receiving backup candidate data.

A fifth feature, combinable with any of the previous or following features, wherein the first thread of the data processing apparatus has a lower scheduling priority than the second, separate thread of the data processing apparatus.

A sixth feature, combinable with any of the previous or following features, wherein storing the session into a database includes storing the session into a ring buffer.

In a second implementation, a non-transitory, computer-readable medium storing one or more instructions executable by a computer system to perform operations of a rule system including receiving, by a first thread of the computer system, a backup trigger for backing up session of an application being executed by a second, separate thread of the computer system; serializing, by the first thread of the computer system, session, wherein serializing the session includes blocking execution of the application by the second thread of the computer system; storing the serialized session into a database; and validating the stored session.

The foregoing and other described implementations can each, optionally, include one or more of the following features:

A first feature, combinable with any of the following features, the operations includes, after validating the stored session, entering into a sleep interval during which the first thread of the computer system is refrained from backing up data.

A second feature, combinable with any of the previous or following features, wherein receiving a backup trigger includes receiving the backup trigger during a sleep interval during which the first thread of the computer system is refrained from backing up data.

A third feature, combinable with any of the previous or following features, wherein the sleep interval is determined dynamically based on a size of the stored session.

A fourth feature, combinable with any of the previous or following features, wherein receiving a backup trigger includes receiving backup candidate data.

A fifth feature, combinable with any of the previous or following features, wherein the first thread of the computer system has a lower scheduling priority than the second, separate thread of the computer system.

A sixth feature, combinable with any of the previous or following features, wherein storing the session into a database includes storing the session into a ring buffer.

In a third implementation, a computer-implemented system, including a computer memory; and a hardware processor interoperably coupled with the computer memory and configured to perform operations of a rule system including: receiving, by a first thread of the hardware processor, a backup trigger for backing up session of an application being executed by a second, separate thread of the hardware processor; serializing, by the first thread of the hardware processor, session, wherein serializing the session includes blocking execution of the application by the second thread of the hardware processor; storing the serialized session into a database; and validating the stored session.

The foregoing and other described implementations can each, optionally, include one or more of the following features:

A first feature, combinable with any of the following features, the operations includes, after validating the stored session, entering into a sleep interval during which the first thread of the hardware processor is refrained from backing up data.

A second feature, combinable with any of the previous or following features, wherein receiving a backup trigger includes receiving the backup trigger during a sleep interval during which the first thread of the hardware processor is refrained from backing up data.

A third feature, combinable with any of the previous or following features, wherein the sleep interval is determined dynamically based on a size of the stored session.

A fourth feature, combinable with any of the previous or following features, wherein receiving a backup trigger includes receiving backup candidate data.

A fifth feature, combinable with any of the previous or following features, wherein the first thread of the hardware processor has a lower scheduling priority than the second, separate thread of the hardware processor.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., or less than 5 secs. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be, or further include, special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data includes all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain this disclosure. Other changes, substitutions, and alterations are also possible without departing from the spirit and scope of this disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method for asynchronous session storing, comprising:
   receiving, by a first thread of a data processing apparatus, a backup trigger for backing up a session of an application being executed by a second, separate thread of the data processing apparatus;
   serializing, by the first thread of the data processing apparatus, the session, wherein serializing the session comprises blocking, using a semaphore, the second thread from running to prevent execution of the application by the second thread of the data processing apparatus;
   storing the serialized session into a database; and
   performing a validation comprising:
      instantiating a sandbox rule engine, wherein the sandbox rule engine mimics the application executing on the second thread;
      loading the stored session in the sandbox rule engine;
      assessing that the stored session is compatible with master data associated with the session; and
      validating the stored session based on the assessment.

2. The computer-implemented method of claim 1, comprising, after validating the stored session, entering into a sleep interval during which the first thread of the data processing apparatus is refrained from backing up data.

3. The computer-implemented method of claim 1, wherein receiving the backup trigger comprises receiving the backup trigger during a sleep interval during which the first thread of the data processing apparatus is refrained from backing up data.

4. The computer-implemented method of claim 3, wherein the sleep interval is determined dynamically based on a size of the stored session.

5. The computer-implemented method of claim 1, wherein receiving the backup trigger comprises receiving backup candidate data.

6. The computer-implemented method of claim 1, wherein the first thread of the data processing apparatus has a lower scheduling priority than the second, separate thread of the data processing apparatus.

7. The computer-implemented method of claim 1, wherein storing the session into the database comprises storing the session into a ring buffer.

8. The computer-implemented method of claim 1, wherein the mimicking comprises behaving identically to the application executing on the second thread.

9. A non-transitory, computer-readable medium storing one or more instructions executable by a computer system to perform operations for asynchronous session storing comprising:
  receiving, by a first thread of the computer system, a backup trigger for backing up a session of an application being executed by a second, separate thread of the computer system;
  serializing, by the first thread of the computer system, the session, wherein serializing the session comprises blocking, using a semaphore, the second thread from running to prevent execution of the application by the second thread of the computer system;
  storing the serialized session into a database; and
  performing a validation comprising:
    instantiating a sandbox rule engine, wherein the sandbox rule engine mimics the application executing on the second thread;
    loading the stored session in the sandbox rule engine;
    assessing that the stored session is compatible with master data associated with the session; and
    validating the stored session based on the assessment.

10. The non-transitory, computer-readable medium of claim 9, the operations comprises, after validating the stored session, entering into a sleep interval during which the first thread of the computer system is refrained from backing up data.

11. The non-transitory, computer-readable medium of claim 9, wherein receiving the backup trigger comprises receiving the backup trigger during a sleep interval during which the first thread of the computer system is refrained from backing up data.

12. The non-transitory, computer-readable medium of claim 11, wherein the sleep interval is determined dynamically based on a size of the stored session.

13. The non-transitory, computer-readable medium of claim 9, wherein receiving the backup trigger comprises receiving backup candidate data.

14. The non-transitory, computer-readable medium of claim 9, wherein the first thread of the computer system has a lower scheduling priority than the second, separate thread of the computer system.

15. The non-transitory, computer-readable medium of claim 9, wherein storing the session into the backup trigger comprises receiving the backup trigger during a sleep interval during which the first thread of the computer system is refrained from backing up data.

16. A computer-implemented system, comprising:
  a computer memory; and
  a hardware processor interoperably coupled with the computer memory and configured to perform operations for asynchronous session storing comprising:
    receiving, by a first thread of the hardware processor, a backup trigger for backing up a session of an application being executed by a second, separate thread of the hardware processor;
    serializing, by the first thread of the hardware processor, the session, wherein serializing the session comprises blocking, using a semaphore, the second thread from running to prevent execution of the application by the second thread of the hardware processor;
    storing the serialized session into a database; and
    performing a validation comprising:
      instantiating a sandbox rule engine, wherein the sandbox rule engine mimics the application executing on the second thread;
      loading the stored session in the sandbox rule engine;
      assessing that the stored session is compatible with master data associated with the session; and
      validating the stored session based on the assessment.

17. The computer-implemented system of claim 16, the operations comprises, after validating the stored session, entering into a sleep interval during which the first thread of the hardware processor is refrained from backing up data.

18. The computer-implemented system of claim 16, wherein receiving the backup trigger comprises receiving the backup trigger during a sleep interval during which the first thread of the hardware processor is refrained from backing up data, wherein the sleep interval is determined dynamically based on a size of the stored session.

19. The computer-implemented system of claim 16, wherein receiving the backup trigger comprises receiving backup candidate data.

20. The computer-implemented system of claim 16, wherein the first thread of the hardware processor has a lower scheduling priority than the second, separate thread of the hardware processor.

* * * * *